Patented June 12, 1951

2,556,527

UNITED STATES PATENT OFFICE 2,556,527

DYESTUFF ETHERS

George Frank Duffin and John David Kendall, Ilford, England, assignors to Ilford Limited, Ilford, England, a British company No Drawing. Application November 17, 1949, Serial No. 128,003. In Great Britain November 23, 1948

10 Claims. (Cl. 260—304)

This invention relates to the production of dyestuffs and pigments. In our co-pending application Serial No. 59,182 (now Patent No. 2,513,923) a process is described for producing new and valuable dyestuffs and pigments which comprises reacting together a monocarboxylic acid anhydride and a compound of the following general structure A:

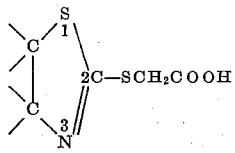

A

Such compounds may fall into three classes, viz.:

FORMULA 1

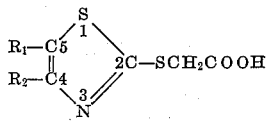

which are S-(thiazolyl-2)thioglycollic acids,

FORMULA 2

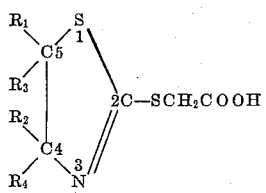

which are S-(thiazolinyl-2)thioglycollic acids, and

FORMULA 3

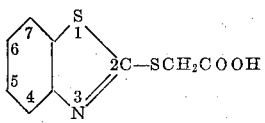

which are S-(benzthiazolyl-2)thioglycollic acids. This last class of compound may contain substituents on the benz ring, e. g. alkyl, aryl, aralkyl, alkoxy, amino and substituted amino groups or halogen atoms, or further fused benzene rings. These latter compounds may be, for example, naphthathiazole, anthrathiazole, phenanthrathiazole or anthraquinone-thiazole compounds.

The R groups in Formulae 1 and 2 may be hydrogen atoms or alkyl, aryl or aralkyl groups. Examples of suitable alkyl groups are methyl, ethyl, propyl, butyl and higher alkyl groups, aralkyl groups may be, for example, benzyl or naphthylmethyl, and aryl groups may be, for example, phenyl or naphthyl.

The structure of the dyes and pigments obtained is believed, on the evidence available from analysis, to be represented by the following formulae which show the cis and trans modifications:

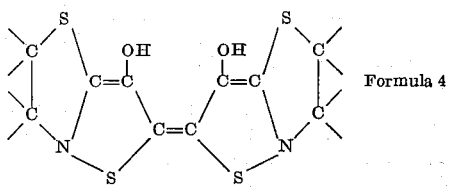
Formula 4

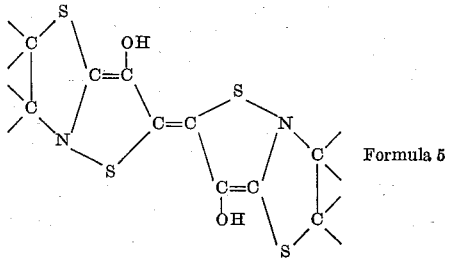
Formula 5

The hydroxy groups may be acylated in the products, due to the acylating action of the carboxylic acid anhydride, but these acyl groups are usually easily removed when the product is dissolved in alcoholic caustic soda or ammonia.

It will be seen from the foregoing formulae that the reaction takes place between two molecules of the thioglycollic acid and results in the removal of two molecules of water with a subsequent rearrangement of the molecular structure.

The products obtained from compounds of the Formulae 1, 2 and 3 correspond to the general Formulae 4 and 5 with appropriate variations in the thiazole ring systems. They resemble indigo and thioindigo in physical characteristics, for example in respect of their colours, their insolubility and their stability, but they are not susceptible to reduction to a leuco base as are the indigos.

It has now been discovered that the hydroxy groups in the aforesaid dyes and pigments may be etherfied and that the akyl ethers obtained are themselves extremely valuable products, particularly as pigments. They are virtually completely insoluble in all the normal organic and inorganic solvents. The ethers may be formed by any of the methods known in the literature for converting hydroxy groups into akyl ether groupings, a particular method of value being the treatment of the hydroxy material or the corresponding acyl material with an alkyl, alkylene or aralkyl halide in an alkaline medium. Aralkyl ethers are a species of alkyl ethers, and so also are the alkylene ethers. Alkyl and alkylene groups may be of short chain length, e. g. methyl, ethyl, methylene or ethylene, or of long chain length, e. g. dodecyl, octadecyl, cetyl and dodecylene. Aralkyl groups may be benzyl, naphthylmethyl and homologues thereof.

The following examples serve to illustrate the invention but are not to be regarded as limiting the invention in any way:

EXAMPLE 1

*Preparation of the methyl ether of the dye prepared from S-benzthiazolyl (2) thioglycollic acid*

A. 1 part by weight of the dye (prepared as in Example 1 of our above co-pending application Serial No. 59,182) was dissolved in a mixture of 10 parts by volume of 10% aqueous sodium hydroxide and 200 parts by volume of methyl alcohol and filtered. To this solution while boiling under reflux, 2 parts by volume of methyl iodide were added. The boiling was continued for one hour, the mixture cooled and filtered. The product was dried and extracted with acetone until the washings became colourless, when the product was obtained as a dark blue powder with a bronze lustre, melting point above 300° C.

B. 34 parts by weight of the dye were dissolved in 60 parts by volume of aqueous ammonia (S. G. .920) and 3000 parts by volume of water and the dark blue solution filtered. To this solution, cooled in water, was added dimethyl sulphate until the solution decolourised. The product was then filtered off, washed with ammonia, dried and extracted with acetone, finally yielding a dark blue powder with a bronze lustre.

EXAMPLE 2

*Preparation of the ethyl ether of the dye prepared from S-benzthiazolyl (2) thioglycollic acid*

1 part by weight of the dye (prepared as in Example 1 of our above co-pending application Serial No. 59,182) was dissolved in a mixture of 10 parts by volume of 10% aqueous sodium hydroxide and 200 parts by volume of ethyl alcohol and filtered. To this solution, while boiling under reflux, was added 2 parts by volume of ethyl iodide and the boiling continued for one hour. The mixture was then cooled, the product filtered off and extracted with acetone until the washings were colourless. The product was obtained as a dark blue powder with a bronze lustre, melting point above 300° C.

EXAMPLE 3

*Preparation of the ethylene ether from the dye from S-benzthiazolyl (2) thioglycollic acid*

5 parts by weight of the dye (prepared as in Example 1 of our above co-pending application Serial No. 59,182) were dissolved in a mixture of 30 parts by volume of 10% aqueous sodium hydroxide and 250 parts by volume of ethyl alcohol. The solution was filtered and then 5 parts by volume ethylene dibromide added, together with a trace of sodium iodide. The reactants were boiled for one hour, the dye filtered off and washed alternately with aqueous ammonia (S. G.=.920) and ethyl alcohol, until the washings were colourless. The product was obtained as a dark blue powder, melting point above 300° C.

What we claim is:

1. An ether selected from the class consisting of alkyl, aralkyl and alkylene ethers of a compound selected from the class consisting of compounds of the formulae:

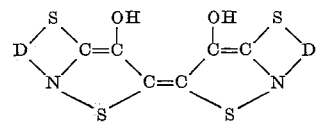

and

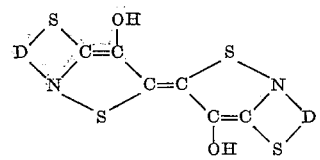

where D represents the atoms necessary to complete a ring system taken from the class consisting of thiazolyl, thiazolinyl and benzthiazolyl.

2. An alkyl ether of a compound selected from the class consisting of compounds of the formulae:

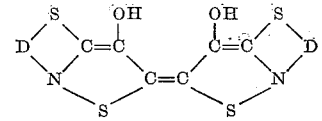

and

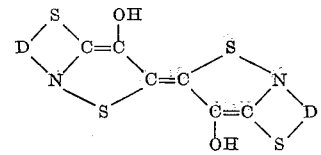

where D represents the atoms necessary to complete a ring system taken from the class consisting of thiazolyl, thiazolinyl and benzthiazolyl.

3. An aralkyl ether of a compound selected from the class consisting of compounds of the formulae:

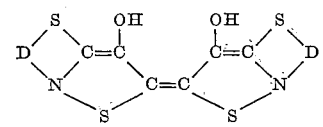

and

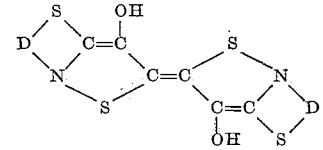

where D represents the atoms necessary to complete a ring system taken from the class consisting of thiazolyl, thiazolinyl and benzthiazolyl.

4. An alkylene ether of a compound selected from the class consisting of compounds of the formulae:

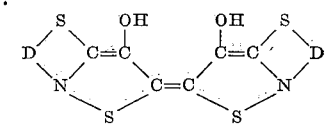

and

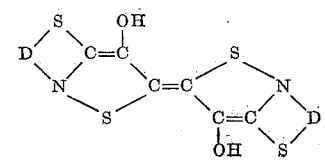

where D represents the atoms necessary to complete a ring system taken from the class consisting of thiazolyl, thiazolinyl and benzthiazolyl.

5. A methyl ether of a compound selected from the class consisting of compounds of the formulae:

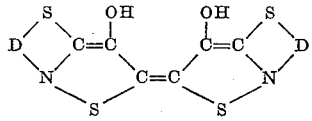

and

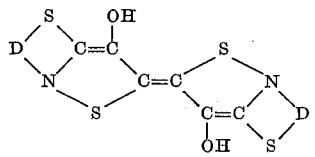

where D represents the atoms necessary to complete a ring system taken from the class consisting of thiazolyl, thiazolinyl and benzthiazolyl.

6. An ethyl ether of a compound selected from the class consisting of compounds of the formulae:

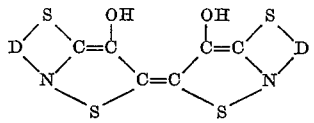

and

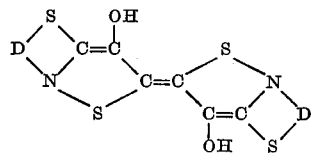

where D represents the atoms necessary to complete a ring system taken from the class consisting of thiazolyl, thiazolinyl and benzthiazolyl.

7. An ethylene ether of a compound selected from the class consisting of compounds of the formulae:

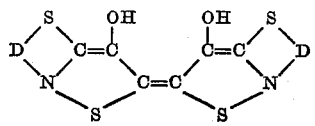

and

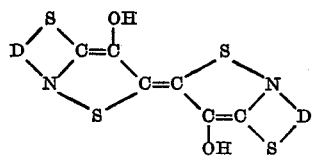

where D represents the atoms necessary to complete a ring system taken from the class consisting of thiazolyl, thiazolinyl and benzthiazolyl.

8. The methyl ether of the compound selected from the class consisting of compounds of the formulae:

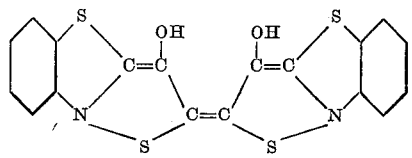

and

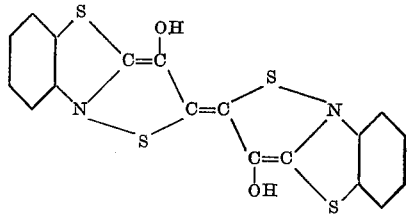

9. The ethyl ether of the compound selected from the class consisting of compounds of the formulae:

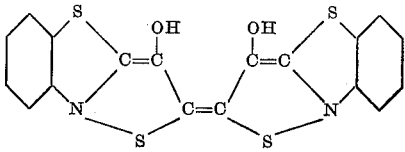

and

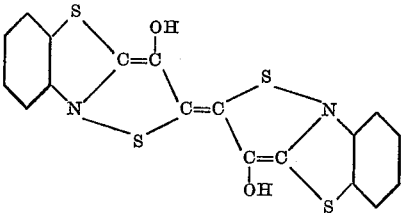

10. The ethylene ether of the compound selected from the class consisting of compounds of the formulae:

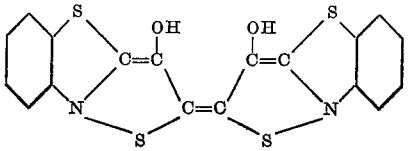

and

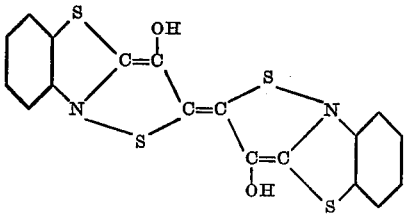

GEORGE FRANK DUFFIN.
JOHN DAVID KENDALL.

No references cited.